United States Patent [19]

Piekarczyk et al.

[11] Patent Number: 4,820,445
[45] Date of Patent: Apr. 11, 1989

[54] ACTIVE MATERIAL FOR THE MANUFACTURE OF LASER RODS

[75] Inventors: Wladyslaw Piekarczyk; Marek Berkowski; Gabriel Jasiolek, all of Warsaw; Witold Ryba-Romanowski, Wroclaw; Mieczyslaw Chabiera, Warsaw, all of Poland

[73] Assignees: Polska Akademia Nauk, Instytut Fizyki, Warsaw; Polska Akademia Nauk, Instytut Niskich Temperature i Baden Strukturalnych, Wroclaw, both of Poland

[21] Appl. No.: 59,953

[22] Filed: Jun. 9, 1987

[30] Foreign Application Priority Data

Jun. 27, 1986 [PL] Poland ................................... 260309

[51] Int. Cl.$^4$ ............................................. C09K 11/04
[52] U.S. Cl. .............................. 252/301.4 R; 501/152; 423/263; 156/DIG. 80
[58] Field of Search ................. 252/301.4 R; 423/263; 501/152; 156/DIG. 80

[56] References Cited

U.S. PATENT DOCUMENTS 3,897,358 7/1975 Greskowich et al. ............ 501/1265

OTHER PUBLICATIONS

A. A. Kaminskii, "Achievements in the Field of Physics and Spectroscopy of Activated Laser Crystals", Phys. Stat. Sol. vol. 87, pp. 11–57 (1985).
A. A. Kaminskii, "Investigation of Trigonal $(La_{1-x}Nd_x)_3Ga_5SiO_{14}$ Crystals", Phys. Stat. Sol., vol. 80, pp. 387–398 (1983).
Jezowska-Trzebiatowska et al., "Structure of Erbium Pentaphosphate", Acta Cryst. B36, 1639–1641 (1980).
Dornauf et al., "Concentration-Dependent Flourescence-Quenching $IrLa_{1-x}PrP_5O_{14}$", Journal of Luminescence, vol. 22, pp. 1–16 (1980).
M. Berkowski, et al.; Absorption and Birefrigence of $BaLaGa_3O_7$ Single Crystals; Physica 123B (1984) pp. 215–219.
J. Przedmojski, et al.; X-ray Investigations of $BaLaGa_3O_7$ Single Crystals; Crystal Res. & Technol. 19 1984; pp. 1483–1487.
G. Jasiolek, et al.; Characterization of the $BaLaGa_3O_7$ Single Crystals Grow by the Czochralski Method; Aeta Cryst., A40, Suppl. (1984); pp. 201–202.
W. Piekarczyk, et al.; The Czochralski Growth of $BaLaGa_3O_7$ Single Crystals; Journal of the Less-Common Metals, III (1985) pp. 247–248.
W. Piekarczyk, et al.; The Czochralski Growth of $BaLaGa_3O_7$ Single Crystals; Journal of Crystal Growth 71 (1985) pp. 395–398.
W. Soluch, et al.; Elastic, Piezoelectric, and Dielectric Properties of the $BaLAGa_3O_7$ Crystal; J. Appl. Phys. 58(6) Sep. 15, 1985; pp. 2285–2287.
E. Snitzer; Glass Lasers; Applied Optics; Oct. 1966, vol. 5, No. 10, pp. 1487–1497.
W. Koechner; Solid State Laser Engineering; Springer Verlag, New York 1976.
Z. J. Kiss, et al.; Crystalline Solid Lasers; Applied Optics, vol. 5, No. 10, Oct. 1966; pp. 1474–1486.
A. A. Kaminskii; Laser Crystal; Springer-Verlag, Berlin, 1981.

Primary Examiner—William R. Dixon, Jr.
Assistant Examiner—Karl Group

[57] ABSTRACT

An active material for the manufacture of laser rods, having the chemical composition expressed by the formula $A_{1+x}B_{1-y}C_{3-x}O_{7-0.5x}$, wherein A is barium, strontium, calcium, or a mixture thereof; B is lanthanum, yttrium, or a mixture thereof; C is gallium, aluminum, or a mixture thereof; and x and y assume both positive and negative values from −0.12 to +0.12;; and as a dopant an active element chosen from the group consisting of praseodymium, neodymium, samarium, europium, gadolinium, terbium, dysprosium, erbium, thulium and ytterbium in an amount of from 0.02 to 8.33 atomic percent.

1 Claim, No Drawings

ACTIVE MATERIAL FOR THE MANUFACTURE OF LASER RODS

This invention relates to an active material for the manufacture of laser rods, wherein a single crystal of gallate, or aluminate of alkaline earths and lanthanum, yttrium with a tetragonal structure of gehlenite is the matrix, and an element from the group of lanthanoids, and particularly neodymium is the active dopant.

Those skilled in the art know active materials, wherein various solids form a matrix for an active dopant from the lanthanoid group, said solids having the required structural, spectral and thermal properties. To the best known materials belong: single crystals of yttrium-aluminum garnet($Y_3Al_5O_{12}$, YAG), yttrium-aluminum perovskite ($YAl_3$, YAP), fluorite ($CaF_2$), and calcium molybdate ($CaMoO_4$); see Walter Koechner, Solid State Laser Engineering, Springer Verlag, New York, 1976; and Inorganic Mineral (oxide glasses), see E. Snitzer, Appl. Optic, vol. 10, pp. 1487–1497 (1966).

Most widely used is yttrium-aluminum garnet with addition of neodymium (YAG:Nd) (Z. J. Kiss, R. J. Pressley, Appl. Optic. vol. 5, pp. 1474–1486 (1966) and A. A. Kaminskij, Laser Crystals, Springer, Verlag, Berlin (1981), because of an advantageous combination of properties.

A laser rod made of this material emits non-polarized electro-magnetic radiation with extremely small spectral width. YAG crystals have a regular structure and are, in consequence, optically isotropic and for this reason laser rods made of this material emit non-polarized light. Emission of polarized light can also be obtained by the use of special structural designs, for instance by setting the front faces of a laser rod at Brewster angle, or by the use of additional optical elements (polarizers).

The laser material is featured with a high amplification factor and is particularly suitable for operation in the generator made and for this reason it is used only as a generator.

The existing structure of single crystals applicable for the manufacture of laser rods must be almost perfect, since any optical inhomogeneities lead in effect to diffraction and dispersion of the laser beam and thus reduce intensity and coherence of the emitted radiation. To the defects of the structure, which decrease the laser efficiency belong twinnings, inhomogenous chemical composition, dislocation, inclusions, bubbles, etc.

Because of the limited solubility of neodymium in YAG and the small value of the neodymium segregation coefficient, manufacture of neodymium doped YAG single crystals free of optical defects, with a uniform distribution of dope, particularly at a high doping level is a difficult and time consuming process. Substitution of $Yb^{3+}$ ions by $Nd^{3+}$ ions is non-isomorphic, because a chemical compound with chemical composition $Nd_3Al_5O_{12}$ with a garnet structure isomorphic to YAG does not exist. $Nd_2O_3$ and $Al_2O_3$ oxides form only a compound with the composition $NdAlO_3$ with perovskite structure. Attempts to introduce a considerable amount of neodymium into a garnet crystal lead to defects of the crystal lattice or, in extreme cases, to inclusions of other solid phases. Manufacture of single crystals with a high optical quality is difficult already when the neodymium content exceeds 1 atomic percent. In order to obtain a single crystal with a uniform distribution of neodymium dopant one must use a small pulling rate which prolongs considerably the manufacturing process.

The material according to this invention is an active one with an active dopant of ions from the lanthanoid group and it serves for the manufacture of laser rods. The basic feature of this material consists in that a single crystal of gallates, or aluminates of alkaline earths and lanthanum or yttrium is used as a matrix for active ions. Chemical composition of that material mahy be expressed by means of a general formula $ABC_3O_7$, wherein A is barium (Ba), strontium (Sr), calcium (Ca), or a mixture thereof, B is lanthanium (La), yttrium (Y), or a mixture thereof, C is gallium (Ga), aluminum (Al), or a mixture thereof. Depending upon the kind of the components and manufacturing conditions of the material according to this invention, its chemical composition can show slight deviations from stoichiometry and it can be expressed by the following formula $A_{1+x}B_{1-y}C_{3-x+y}O_{7-0.5x}$, wherein x and y can assume either positive, or negative values in the interval from 0 to 0.12.

The active dopant in that material is an element or mixture of elements from the lanthanoid group, and particularly preseodymium (Pr), neodymium (Nd), samarium (Sm), europium (Eu), gadolinium (Gd), terbium (Tb), dysprosium (Dy), holmium (Ho), erbium (Er), thulium (Tm) and ytterbium (Yb), in the amount of from 2/100 to 8⅓ atomic percent.

Specifically recommended as an active material for the manufacture of laser rods are single crystals of barium-lanthanium-gallium gehlenite which contains neodymium as an active dopant (BLGO:Nd). Advantages of this material are shown when compared with YAG:Nd.

To the crystal matrix there can be introduced a dopant in the amount exceeding considerably that which can be introduced in the case of YAG:Nd, without decreasing the optical quality of the BLGO:Nd single crystal.

Segregation coefficient of neodymium in BLGO is approximately equal to 1 and thus the dopant is distributed in the matrix very uniformly which is hardly obtainable in the case of YAG:Nd.

The pulling rate of BLGO:Nd single crystals (about 4 mm per hour) is considerably greater than that of YAG:Nd single crystals (about 1 mm per hour).

The melting point of BLGO (1560 centigrade degrees) is considerably lower than the melting point of YAG (1930 centigrade degrees). Owing to that and owing to a considerable single crystal pulling rate the wear of the iridium crucible during the pulling process is slower.

The BLGO:Nd crystal is optically uniaxial. Due to this, it can be used for the manufacture of laser rods with the required amplification factor depending upon the angle between the geometric axis of the laser rod and the optical axis of the active material being used and it can operate either in the generator mode, or in the light amplifier mode and thus emit fully linearly polarized light. This is not obtainable in the case of an isotropic YAG:Nd.

The hardness of BLGO crystals is slightly smaller than that of YAG ones, which facilitates their machining (cutting, grinding and polishing).

BLGO crystals have a gehlenite structure devoid of a center of symmetry. As a consequence, BLGO single crystals have piezoelectric properties. These properties can be utilized in laser resonator tuning systems.

The material according to the invention will be explained in detail by way of an example, the active material BaLaGa$_3$O$_7$ (BLGO).

Doped gehlenite single crystals can be produced by crystallization from a melt by using one of the well-known methods of Czochralski, Bridgmann or a zone melting, preferable being the method of manufacture of single crystals of gallium or aluminum gehlenite of alkaline earths and lanthanum, or yttrium with addition of other lanthanoids being a method of pulling of single crystal from a melt by the Czochralski method. According to that method the melt is obtained by melting a mixture of extremely pure pulverized metal oxides contained in the single crystal being pulled in an iridium crucible. The melt has principally the same chemical composition as that of the pulled single crystal. Slight deviations smaller than 1 atomic percent are permissible. Instead of metal oxides also carbonates of those metals which when being heated decompose and transform into the respective oxides and next are being melted can be used. If carbonates are being used, the temperature rising rate must be limited so as to make possible a required thermal decomposition of them. Next a smaller-diameter oriented single crystal line seed is dipped into the melt, whose temperature is slightly higher than the melting point of the material being pulled and then slowly lifted upwards and simultaneously rotated around the vertical axis. On the seed being pulled there grows a single crystal with an orientation corresponding to the crystallographic orientation of the seed. The diameter of the single crystal being pulled is adjusted (controlled) by variation of the melt temperature. A slow lowering of the temperature of the melt leads to an increase of diameter of the single crystal being pulled and, finally, the required final size is obtained. Upon completion of the pulling process the single crystal is detached from the melt by a violent upward movement and next slowly cooled down to room temperature.

Crystals produced by crystallization from the melt using the Czochralski method have a chemical composition slightly different from the stoichiometric one. Their actual composition can be described by the following general formula: $A_{1+x}B_{1-y}C_{3-x+y}O_{7-0.5x}$, wherein x and y can assume either positive, or negative values. They will depend upon the kind of single crystal components, as well as upon the crystallographic orientation of the phase boundary between the growing crystal and the melt, and the initial chemical composition of the melt. Deviations of the chemical composition are relatively small and range within the limits of one atomic percent.

Raw material consisting of 32.30 parts of BaCO$_3$ by weight, 22.94 parts of La$_2$O$_3$ by weight, 0.57 parts of Nd$_2$O$_3$ by weight and 44.19 parts of Ga$_2$O$_3$ by weight, in the form of perfectly mixed powders is put into an iridium crucible which is next slowly heated by means of high-frequency induction currents in an apparatus for pulling of single crystals by the Czochralski method. The material is heated in a nitrogen atmosphere to a temperature slightly higher than the BLGO melting point, that is 1560 centigrade degrees. The oriented single crystal seed is mounted to a tube made of Al$_2$O$_3$ and lowered downwards from the top until it comes into contact with the surface of the melt and next it is again lifted upwards with a rate of 4 mm per hour and, simultaneously, rotated around a vertical axis. The diameter of the single crystal is being increased by lowering the melt temperature until it reaches the required value. Finally, the constant diameter of the crystal being pulled is being maintained automatically by controlling the weight of the crystal being pulled. The rotation rate of the seed is dependent upon the diameter of the crystal being pulled.

In the case of a crystal of diameter of 20 mm pulled from a crucible of 40 mm diameter, rotation rate of the seed ranges within the limits from 65 to 70 r.p.m. Upon completion of the pulling process, the single crystal is to be detached from the surface of the melt and next slowly cooled down to room temperature. The chemical composition of the crystal thus obtained depends upon the crystallographic growth direction and upon the initial composition of the melt. A crystal growing on the /001/ face has a chemical composition which can be expressed approximately by the following chemical formula $Ba_{1.05}La_{0.903}Nd_{0.022}Ga_{3.025}O_{6.975}$. The investigations of the obtained crystal have shown that the cylindrical part the obtained crystal does not contain any iridium inclusion, nor any inclusions of other solid phases and, moreover, it also does not contain any other defects which would decrease its optical quality, such as cracks, bubbles, etc.

We claim:

1. An active material for the manufacture of a laser rod, consisting of a single crystal of the formula $A_{1+x}B_{1-y}C_{3-x+y}O_{7-0.5x}$, wherein A is a material selected from the group consisting of barium, strontium, calcium and a mixture thereof; B is a material selected from the group consisting of lanthanum, yttrium, and a mixture thereof; C is a material selected from the group consisting of gallium, aluminum and a mixture thereof; and x and y are parameters assuming each is between $-0.12$ and $+0.12$; and as a dopant an active element chosen from the group consisting of praseodymium, neodymium, samarium, europium, gadolinium, terbium, dysprosium, erbium, thulium and ytterbium in an amount of from 0.02 to 8.33 atomic percent in relation to all atoms in the formula.

* * * * *